(12) United States Patent
Hallak et al.

(10) Patent No.: US 11,210,006 B2
(45) Date of Patent: Dec. 28, 2021

(54) DISTRIBUTED SCALABLE STORAGE

(71) Applicant: Vast Data Ltd., Tel Aviv (IL)

(72) Inventors: Renen Hallak, Tenafly, NJ (US); Asaf Levy, Tel Aviv (IL); Avi Goren, Tel Aviv (IL); Yogev Vaknin, Karkur (IL); Alex Turin, Kiryat Ono (IL)

(73) Assignee: Vast Data Ltd., Tel Aviv (IL)

( * ) Notice: Subject to any disclaimer, the term of this patent is extended or adjusted under 35 U.S.C. 154(b) by 56 days.

(21) Appl. No.: 16/856,701

(22) Filed: Apr. 23, 2020

(65) Prior Publication Data

US 2020/0249841 A1 Aug. 6, 2020

Related U.S. Application Data

(63) Continuation of application No. 16/002,676, filed on Jun. 7, 2018, now Pat. No. 10,678,461.

(51) Int. Cl.
*G06F 3/06* (2006.01)
*G06F 16/22* (2019.01)
*G06F 11/14* (2006.01)

(52) U.S. Cl.
CPC ............ *G06F 3/064* (2013.01); *G06F 3/0604* (2013.01); *G06F 3/067* (2013.01); *G06F 16/2237* (2019.01); *G06F 16/2246* (2019.01); *G06F 16/2255* (2019.01); *G06F 11/1456* (2013.01)

(58) Field of Classification Search
None
See application file for complete search history.

(56) References Cited

U.S. PATENT DOCUMENTS

| | | | |
|---|---|---|---|
| 7,213,021 B2 | 5/2007 | Taguchi et al. | |
| 8,661,175 B2 | 2/2014 | Sundrani et al. | |
| 10,108,624 B1* | 10/2018 | Vermeulen | G06F 16/334 |
| 10,133,511 B2 | 11/2018 | Muth et al. | |
| 10,545,927 B2* | 1/2020 | Strauss | G06F 16/1865 |
| 2006/0248245 A1 | 11/2006 | Ninomiya et al. | |
| 2010/0268904 A1 | 10/2010 | Sheffield et al. | |
| 2010/0274772 A1 | 10/2010 | Samuels | |
| 2014/0115579 A1 | 4/2014 | Kong | |
| 2016/0239239 A1 | 8/2016 | Tin et al. | |
| 2016/0350325 A1 | 12/2016 | Wang et al. | |
| 2016/0357776 A1 | 12/2016 | Sundaram et al. | |

(Continued)

OTHER PUBLICATIONS

U.S. Appl. No. 16/816,905, filed Mar. 12, 2020, Avi Goren.

(Continued)

*Primary Examiner* — Brian R Peugh
(74) *Attorney, Agent, or Firm* — M&B IP Analysts, LLC (57) ABSTRACT

A storage system. The storage system includes a plurality of storage nodes (DNodes), wherein the DNodes are configured to store a plurality of elements and a plurality of data blocks, wherein each element is a persistent metadata structure, wherein at least one of the elements store at least one attribute, wherein the at least one attribute includes a plurality of pointers, wherein at least one of the data blocks is stored in at least one of the elements when the at least one of the data blocks has a size below a threshold size; and a plurality of compute nodes (CNodes), wherein each CNode has access to each of the DNodes, wherein each CNode is configured to receive an access command and to execute the access command based on the elements.

20 Claims, 6 Drawing Sheets

(56) References Cited

U.S. PATENT DOCUMENTS

| | | |
|---|---|---|
| 2017/0090779 A1 | 3/2017 | Barzik et al. |
| 2017/0147497 A1 | 5/2017 | Phelan et al. |
| 2017/0149890 A1 | 5/2017 | Shamis et al. |
| 2017/0220506 A1 | 8/2017 | Brown et al. |
| 2017/0251058 A1 | 8/2017 | Zachariassen et al. |
| 2017/0286144 A1 | 11/2017 | Barzik et al. |
| 2018/0198765 A1 | 7/2018 | Maybee et al. |
| 2018/0253255 A1 | 9/2018 | Jain et al. |
| 2019/0377490 A1 | 12/2019 | Hallak et al. |

OTHER PUBLICATIONS

Lomet, "Key Range Locking Strategies for Improved Concurrency" Digital Equipment Corp., Feb. 10, 1993.
Ramakrishnan et al., Database Management Systems 2000, McGraw-Hill, 2nd ed., pp. 528-532.

\* cited by examiner

DISTRIBUTED SCALABLE STORAGE

CROSS-REFERENCE TO RELATED APPLICATIONS

This application is a continuation of U.S. patent application Ser. No. 16/002,676 filed on Jun. 7, 2018, now U.S. Pat. No. 10,678,461, the contents of which are hereby incorporated by reference.

TECHNICAL FIELD

The present disclosure relates generally to distributed storage systems, and more particularly to scaling distributed storage systems.

BACKGROUND

Distributed file systems store data on remote servers that are accessible to users via networks. From the user's perspective, files shared via a distributed file system appear to be accessed as if the user were receiving files from a local storage system. Additional storage capacity may be added by increasing the number of servers on which data is stored. Distributed file systems are typically designed for transparency, heterogeneity, and scalability. This allows for convenient, secure sharing of files among nodes of a network with flexible deployment.

There are various types of implementations of distributed file systems in use today. Typically, these implementations adhere to one of two primary approaches. A first approach, distributed caching and locking, involves allowing a node access to data while locking (excluding) other nodes from accessing the data by invalidating the cache of the other nodes. The access is granted by a lock manager that grants the access when the data is not already locked. This approach usually works well as long as data access is local, but faces challenges when multiple nodes attempt to access the same data concurrently. Specifically, performance may degrade due to excessive locking or caching overhead when multiple lock requests are received around the same time.

A second approach, sharding, involves dividing the data among nodes such that each node includes a subset of the data. A drawback of this approach is that, when data that is not stored on a node is accessed, the data must be transferred from another node. Another drawback of this approach is that frequently accessed files on a node may result in the node being overwhelmed, particularly when transfer is required from multiple other nodes. Some existing solutions for this drawback include moving the frequently accessed files among nodes based on load to distribute popular files to different nodes, but these solutions do not effectively deal with short bursts of sudden frequent access.

Due to these and other challenges, performance of distributed file systems fails to scale appropriately as the distributed file systems are scaled. At some point, further scaling is effectively no longer possible.

Another challenge faced by existing distributed file systems is that such systems were typically planned to support a single type of application programming interface (API) for data access, such as the Posix file system. These systems typically support a limited set of protocols for the API. As a result, these systems cannot efficiently handle sharing as additional APIs are added. As an example, when the S3 protocol is implemented to provide compatibility with third party object storage applications and the S3 protocol is not already supported internally by the distributed file system, a S3 protocol server must be added to read the entire directory and sort the file names.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

The disclosed embodiments include a storage system comprising a plurality of storage nodes (DNodes), wherein the DNodes are configured to store a plurality of elements and a plurality of data blocks, wherein each element is a persistent metadata structure, wherein at least one of the elements store at least one attribute, wherein the at least one attribute includes a plurality of pointers, wherein at least one of the data blocks is stored in at least one of the elements when the at least one of the data blocks has a size below a threshold size; and a plurality of compute nodes (CNodes), wherein each CNode has access to each of the DNodes, wherein each CNode is configured to receive an access command and to execute the access command based on the elements.

The disclosed embodiments also include a storage system comprising a plurality of storage nodes (DNodes), wherein the DNodes are configured to store a plurality of elements and a plurality of data blocks, wherein each element is a persistent metadata structure, wherein the plurality of elements include a plurality of metadata blocks, wherein the plurality of metadata blocks store a plurality of attributes, wherein the plurality of attributes includes a plurality of pointers, wherein each element has an element tree including a set of the plurality of metadata blocks, each element tree having a root, wherein the roots of the element trees are stored distributed among the plurality of DNodes; and a plurality of compute nodes (CNodes), wherein each CNode has access to each of the DNodes, wherein each CNode is configured to receive an access command and to execute the access command based on the elements.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments include a storage system. The storage system includes compute nodes ("CNodes") and storage nodes ("DNodes"). The CNodes are configured to translate access commands so as to comply with a protocol supported by the DNodes and to access the DNodes using the translated access commands. The DNodes store data blocks and elements including metadata blocks with pointers to locations in the DNodes. Each CNode may access any of the DNodes such that the CNodes collectively provide distributed transaction management.

The element store includes elements. Each element is a logical unit that has a handle, which is a unique identifier. An element includes an attribute store and may further include an element data store. An element is a dataset. Example elements include, but are not limited to, files, directories, objects, buckets, and volumes (e.g., Amazon® Elastic Block Storage volume). The attribute store includes attributes stored in metadata blocks. The element data store allows for writing to and reading from data included in the element.

Each metadata block in an attribute store of an element may include attributes pointing to other metadata blocks of the attribute store, thereby forming an element tree for the element. Each element tree is a direct acyclic graph representing an element and includes metadata blocks that are persistent metadata structures. The element store may be populated with element trees. The element trees may grow dynamically as the element grows. The root of each element tree is stored in a global hash table distributed among devices in the element store layer. Consistent hashing is performed to allow the global hash table to grow as the storage grows.

The metadata blocks are allocated from a shared pool, thereby allowing for different numbers and sizes of elements. For example, one element may have a size corresponding to that of the entire space of the physical layer, or billions of elements may each have a size corresponding to only a fraction of the space such that they collectively utilize the entire space of the physical layer. Further, different elements in the element store may be different sizes.

The disclosed embodiments provide a cacheless architecture that does not require sharing among user nodes. Advantages of various disclosed embodiments include improved scalability. For example, the use of persistent memory for metadata structures allow fast metadata updates and reads without requiring caching. The disclosed embodiments allow for infinite scaling while providing linear increases in performance as new hardware is added to the storage system.

Other advantages of various disclosed embodiments include resistance to failure due in part to the use of remote persistent metadata structures for identifying locations in physical storage. The remote persistent metadata structures are not stored in compute nodes (CNodes) that perform access operations on the physical storage. Accordingly, failure, removal, or addition of any CNodes does not affect the access by any of the other CNodes.

Various disclosed embodiments also minimize lock contention by requiring locks only for write operations and locking at the metadata block level during writing. Further, a central lock manager is not required and no ownership of locks needs to be assigned because locking may be performed via atomic instructions (e.g., compare-and-swap) on RAM in the DNodes. For example, locking may be performed using remote direct memory access (RDMA) compare- and swap operations on a portion of the RAM in the DNodes.

The disclosed embodiments also provide translation of access commands, which in turn allows for providing access to a data store layer regardless of which protocol is used to initiate reading from or writing to the data store layer. Thus, other advantages according to the disclosed embodiments include allowing flexible support for new protocols without the need for changing the implementation of the CNodes with respect to the element stores or adding inefficient workarounds to a protocol of a protocol server. In some embodiments, different access requirements (e.g., both case sensitive and case insensitive) may be supported.

Figure 1:
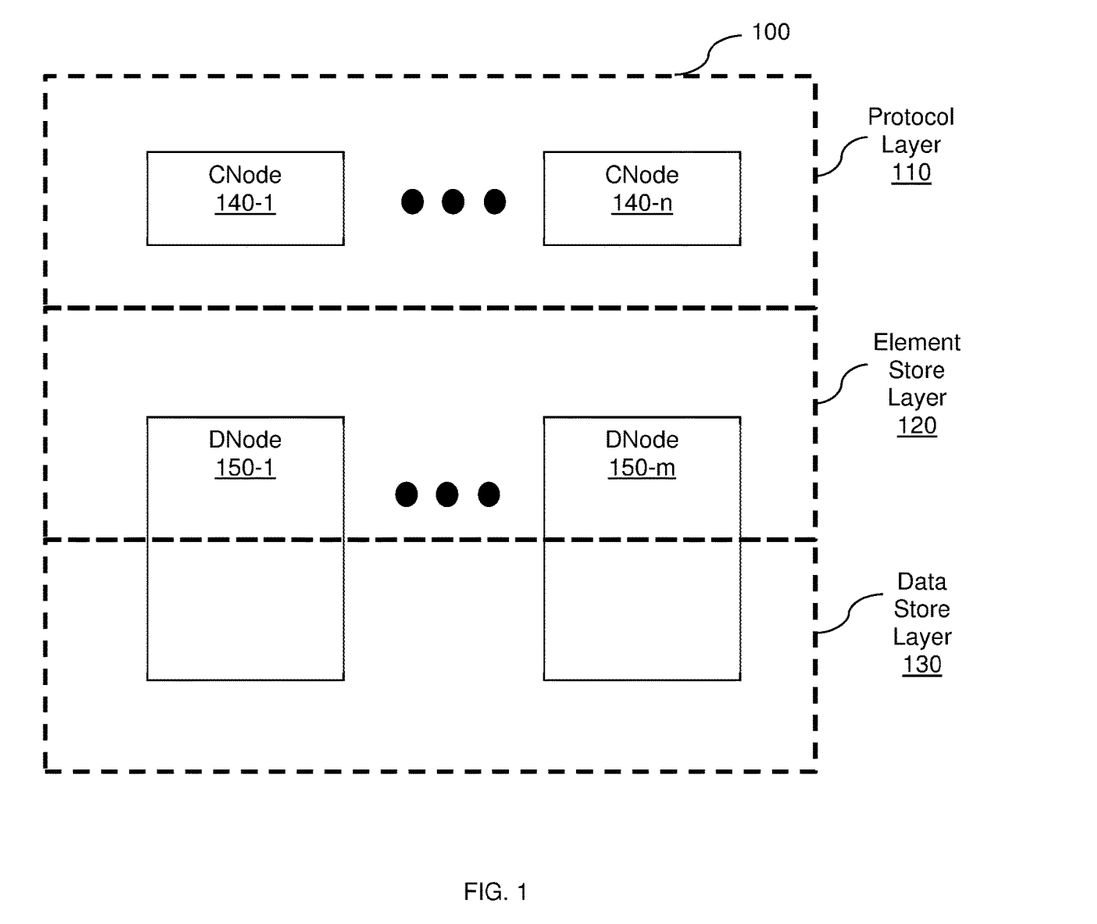
FIG. 1 is a schematic diagram of a storage system according to an embodiment.

FIG. 1 is an example schematic diagram of a storage system 100 according to an embodiment. The example schematic diagram illustrates a protocol layer 110, an element store layer 120, and a data store layer 130.

The protocol layer 110 includes compute nodes (CNodes) 140-1 through 140-$n$, where n is an integer greater than or equal to 2 (referred to as a CNode 140 or as CNodes 140 for simplicity). Each CNode 140 is configured to translate access commands received from client nodes (not shown in FIG. 1) into a format supported by the DNodes 150 and to access storage nodes (DNodes) 150-1 through 150-$m$, where "m" is an integer greater than or equal to 2 (referred to as a DNode 150 or as DNodes 150 for simplicity). Specifically, locations of the data store layer 130 may be accessed by navigating via elements (not shown) of the element store layer 120. The elements include at least pointers to locations in the element store layer 120 and in the data store layer 130.

The DNodes 150 may be realized as combinations of volatile (e.g., RAM) and non-volatile (e.g., Flash, 3D Xpoint) memories. The non-volatile memories may be included in, for example, hard-disk drives (HDDs), solid state drives (SSDs), or a combination thereof. An example schematic diagram of a DNode 150 is described herein with respect to FIG. 3.

Example protocols supported via translation by the CNodes 140 may include, but are not limited to, Block protocols, Network Attached System protocols [e.g., Network File System (NFS) protocol, Server Message Block (SMB) protocol, etc.], Object Store protocols [e.g., Simple Storage Service (S3) protocol], Key Value Store protocol, and the like. The protocol layer 110 allows for receiving access commands in the supported protocols. Because the CNodes 140 are configured to translate access commands into a format that is supported by the protocol of the DNodes 150, support for new protocols may be added by configuring the CNodes 140 with translation rules for the new protocols. The translation rules may include rules for converting access commands in a received format into a format that is compatible with the protocol supported by the DNodes 150.

The CNodes 140 collectively act as a distributed transaction manager for accessing data in the DNodes 150. As the CNodes 140 do not store the data to be accessed by client nodes or the metadata used for navigating to locations in the DNodes 150, such data and metadata do not need to be recovered when one or more of the CNodes 140 fails. Additionally, CNodes 140 may be added or removed without disrupting data stored in the storage system 100. An example schematic diagram of a CNode is described herein below with respect to FIG. 6.

The element store layer 120 includes portions of the DNodes 150 storing elements. Each element is a persistent metadata structure that is remote from the CNodes 140 (hereinafter a "remote persistent metadata structure") and includes at least an attribute store (not shown) including metadata blocks storing attributes. Each attribute has a key and corresponding value. The attributes may include different types of values such as, but not limited to, identifiers (i.e., pointers to other locations), size, time of last access, access control lists (ACLs), application-specific uses (e.g., identifying an object for S3), and the like. Once created, the elements allow for reading of the data blocks regardless of the protocol of the command which triggered its creation, for example, a S3 write request may trigger creation of an element for the data blocks while the data blocks can be read based on a NFS read request.

At least some of the attributes are pointers to other locations. A pointer attribute may have a <key,value> of <name,identifier>, where the identifier is either a handle of an element or an identifier of a physical location in the data store layer 130. Each metadata block may have multiple pointers, at least some of which point to other metadata blocks, thereby creating a tree or buckets. A pointer attribute that acts as a pointer to another metadata block is a link, which allows for navigation among metadata blocks for an element. The metadata block that is pointed to by a link may be stored in another device (e.g., in a device of a different DNode 150).

In some implementations, one or more of the metadata blocks may store an immediate value rather than a pointer to a location in the data store layer 130. The immediate value includes data that would otherwise be stored in the data store layer 130. As a non-limiting example, the data blocks may be stored in a metadata block when the size of the data block is less than 1 kilobyte.

In an embodiment, a metadata block may be a composite block holding the contents of multiple different metadata blocks. Thus, a composite block may hold all of the metadata for an element. A composite block typically includes a pointer to a metadata block and to a data block.

Each element may further include an element data store (not shown) allowing for read and write operations of data to the element. Whether the element includes an element data store may depend on the type of the element. As a non-limiting example, a file may have an element data store. The element data store may be thinly provisioned with byte granularity such that the number of bytes written to the element data store is the number of bytes used.

The data store layer 130 includes physical locations of non-volatile memory that are pointed to by at least some of the elements.

Figure 2:
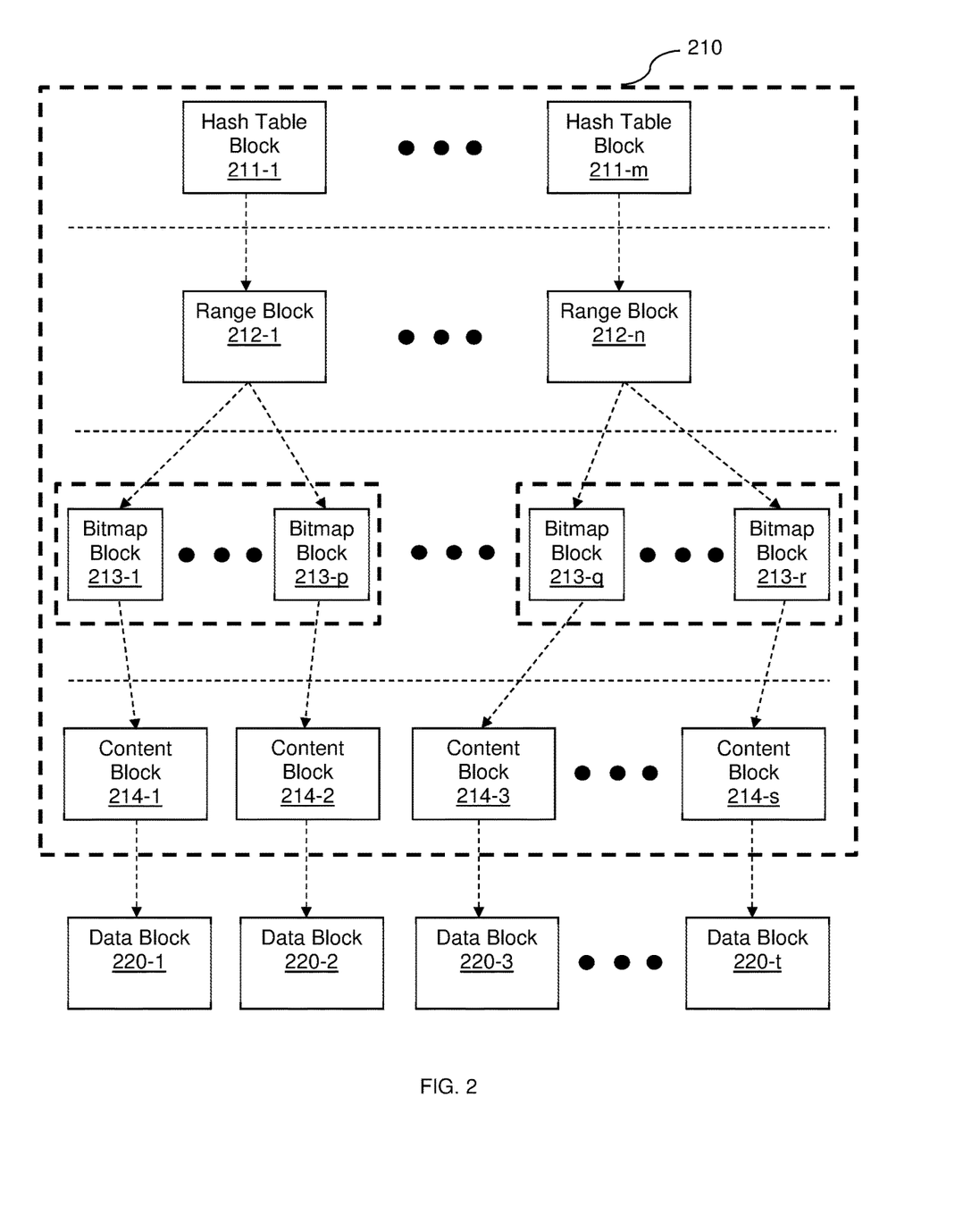
FIG. 2 is a virtualization model of an element store layer according to an embodiment.

FIG. 2 is an example virtualization model 200 of the storage system 100 according to an embodiment. The virtualization model 200 is a tree 210 of metadata blocks. The bottom level of the metadata blocks 210 points to data blocks 220, which are locations in a physical storage. In an example implementation, the metadata blocks include hash table blocks 211, range blocks 212, bitmap blocks 213, and content blocks 214.

The hash table blocks 211 collectively provide a hash table and point to the range blocks 212. The hash table may be maintained as a consistent hash table by balancing portions of the hash table among the DNodes 150 such that the DNodes 150 store equal portions of the hash table, for example by storing equal numbers of the hash table blocks 211. When memory devices (e.g., 3D Xpoint devices) storing the hash table are added or removed, the hash table may be balanced among the remaining memory devices. The hash table includes the root of each element.

The range blocks 212 point to the bitmap blocks 213 using offset ranges such that each range block 212 points to multiple bitmap blocks 213 in the offset range. When there are more bitmap blocks than there are available range block pointers for a first range block 212, a second range block 212 may point to a second range of the bitmap blocks 213.

The bitmap blocks 213 include snaplines. Each snapline indicates contents of a portion of the metadata blocks over time. Because of the persistent nature of the metadata blocks, data of previous versions of the metadata blocks are maintained when updated to add new data. The snaplines allow for efficiently reading block contents from different points in time.

The content blocks 214 include pointers to the data blocks 120. The content blocks 214 provide horizontal views of the respective snaplines that allow for efficient reading of the snaplines. The bitmap blocks 213 and the content blocks 214 may further include a time attribute.

It should be noted that the levels of the metadata blocks shown in FIG. 2 are merely illustrative, and that the disclosed embodiments are not limited to the particular arrangements of or pointing among the metadata blocks shown in FIG. 2.

Figure 3:
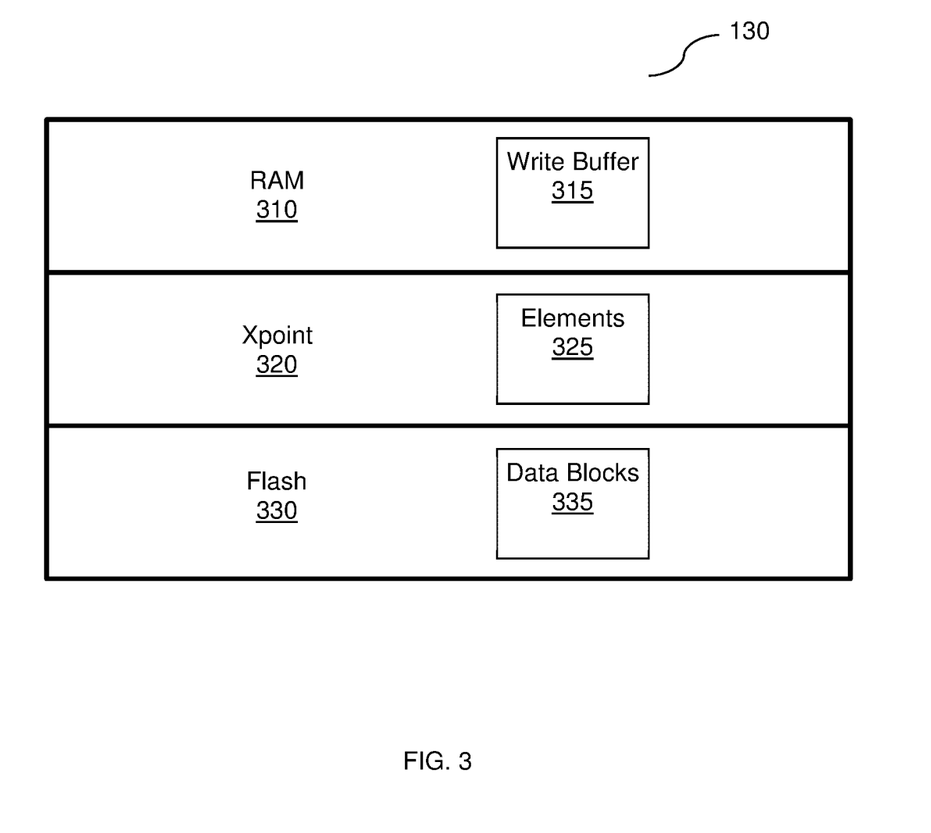
FIG. 3 is a schematic diagram of a storage node according to an embodiment.

FIG. 3 is a schematic diagram illustrating an example DNode 150 according to an embodiment. The DNode 150 includes RAM 310, a first non-volatile memory 320, and a second non-volatile memory 330. The non-volatile memories 320 and 330 may be non-volatile RAM (NVRAM). In the example implementation shown in FIG. 3, the first non-volatile memory 320 is a 3D Xpoint memory and the second non-volatile memory 330 is a Flash memory. The data stored in the memories 310, 320, and 330 are distributed among different memory devices (e.g., memory devices included in the DNodes 140, FIG. 1). The distributed data may include metadata blocks distributed across 3D Xpoint memory devices and data blocks distributed among Flash memory devices. More specifically, hash table blocks (e.g., the hash table blocks 211, FIG. 2) may be equally distributed among Xpoint devices.

Each of the memories 310 through 330 may be a memory device such that data and metadata stored among the DNodes 150, FIG. 1, may be stored across the respective devices. The RAM 310 may be utilized to store, but is not limited to, remote locks for write operations. In some implementations, data stored in the RAM 310 may include mirrored data of metadata blocks (e.g., mirrored copies of data in the range blocks 212, FIG. 2). The memories 320 and 330 may include elements 325 of the element store layer 120 and data blocks 335 of the data store layer 130, respectively.

The memories 320 and 330 may be different types to allow for improved performance, cost, and the like. The use of different types may be utilized to optimize performance with respect to cost. For example, the 3D Xpoint memory may provide faster performance at higher cost as compared to the Flash memory. Accordingly, a higher proportion of the capacity of the DNode 150 may sit on the Flash memory 330 as compared to the 3D Xpoint memory 320. The Flash memory 330 may store the data blocks 335 of the data store layer 130 and the 3D Xpoint memory 320 may store elements 325 of the element store layer 120. The data blocks 335 are physical data blocks having corresponding locations within the Flash memory 330. As a non-limiting example, the capacity of the Xpoint memory 320 may be between 100s of gigabytes and a few terabytes (TBs), while the capacity of the Flash memory 330 may be between a few TBs and 100s of TBs.

In an embodiment, at least a portion of the data blocks 335 may be temporarily included in the elements 325 and stored in the 3D Xpoint memory 320 before being migrated from the 3D Xpoint memory 320 to the Flash memory 330. When the data is migrated to the Flash memory 330, the pointers of the elements 325 which had stored the migrated data may be updated to point to the location of the migrated data in the Flash memory 330. The temporary storage of the data blocks 335 allows for manipulating the data blocks 335 (e.g., via encoding, data reduction, etc.) in the 3D Xpoint memory 320 before migrating the data blocks 335 to the Flash memory 330.

Figure 4:
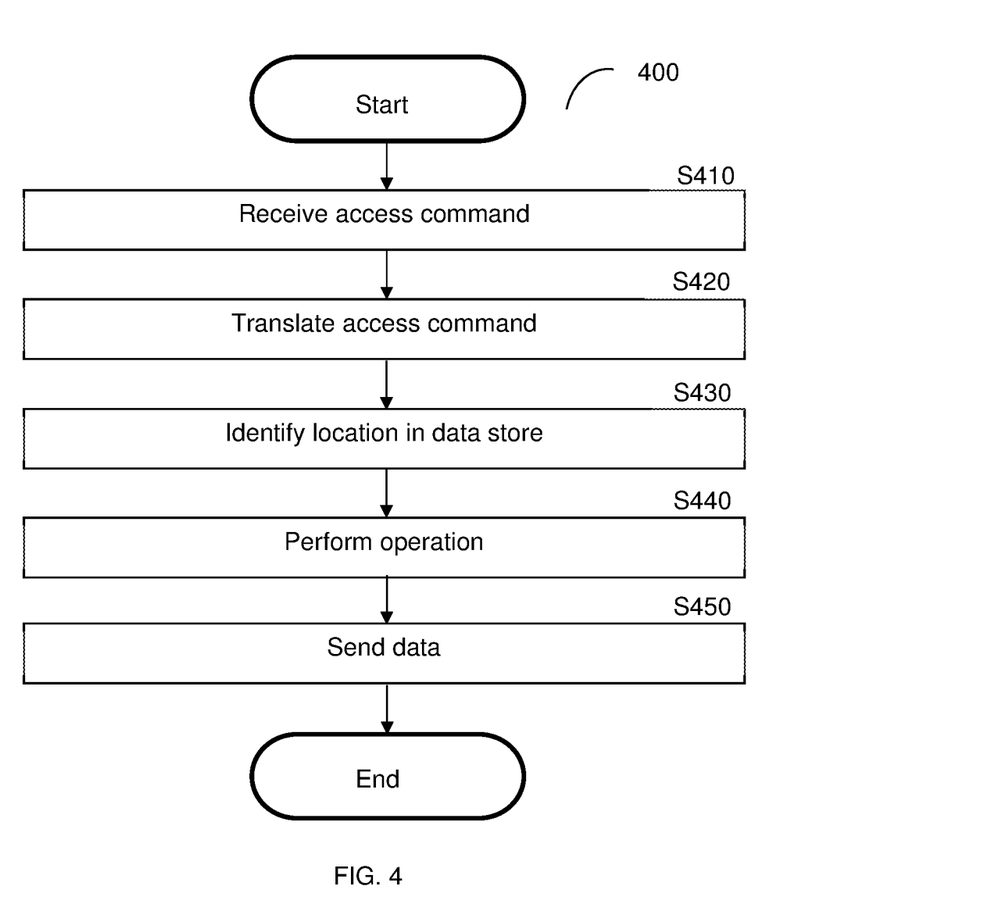
FIG. 4 is a flowchart illustrating a method for accessing storage nodes via a compute node in a distributed storage architecture according to an embodiment.

FIG. 4 is an example flowchart 400 illustrating a method for accessing a storage node (DNode) via a compute node (CNode) in a distributed storage architecture according to an embodiment. In an embodiment, the method is performed by a CNode 140 to access one of the DNodes 150.

At S410, an access command is received. The access command may be, but is not limited to, read, write, delete, update create, link, unlink, rename, symlink, get attribute, and other commands to perform operations defined in supported protocols.

At S420, the received access command is translated into a format compatible with a protocol of the DNode to be accessed. The translation may be performed based on translation rules defining changing a command from an unsupported format to a unified format supported by the DNode. As a non-limiting example, the NFS command "open.client" may be translated to a unified API command "open.element."

At S430, a location in a data storage layer is identified. In an embodiment, identifying the location in the data storage layer includes navigating among metadata blocks based on the pointers in the metadata blocks. The navigation further includes computing a hash function based on a hash table distributed across the metadata blocks. The identified location is pointed to by the last navigated metadata block. Accessing data blocks by navigating among the metadata blocks reduces lock contention by allowing for taking locks at the single metadata block level when writing and not requiring any locks when reading. Further, because locks are assigned to metadata blocks, a central lock manager configured to assign locks to nodes is not required.

At S440, the translated access command is performed on the DNode at the identified location. At optional S450, if the performed access command included reading data, the data is sent to the client node that sent the original access command.

Figure 5:
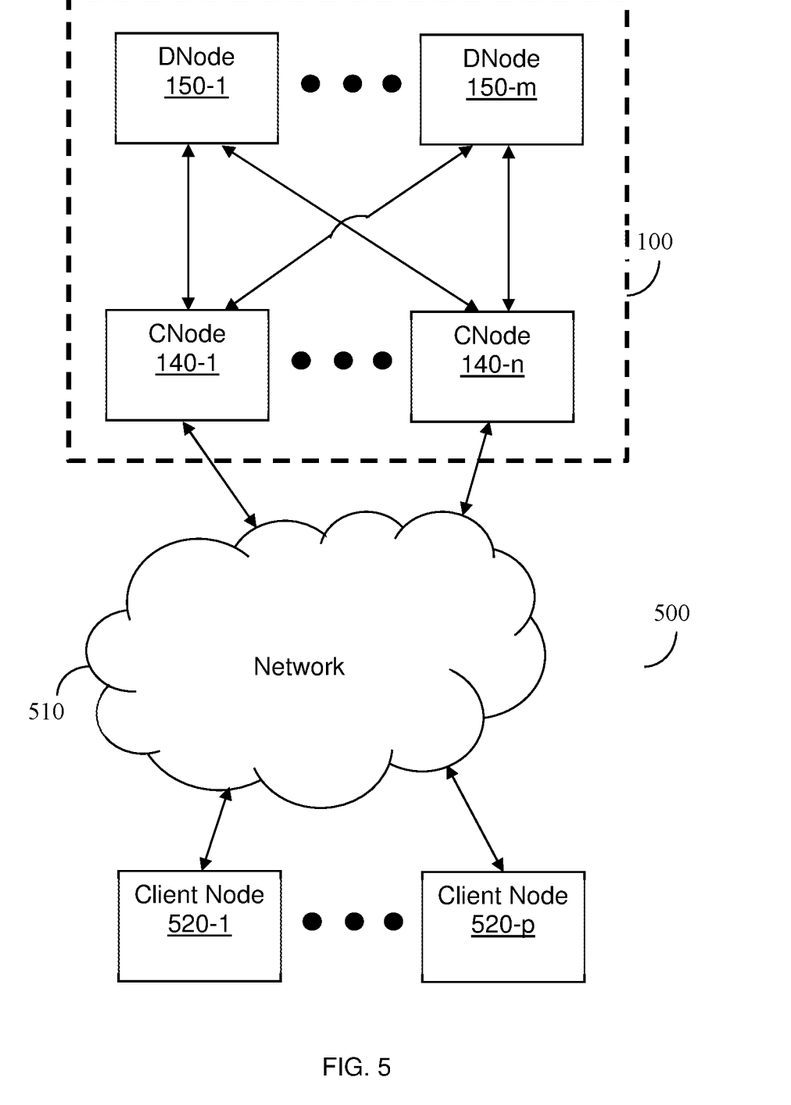
FIG. 5 is a network diagram utilized to describe various disclosed embodiments.

FIG. 5 is a network diagram 500 utilized to describe various disclosed embodiments. The network diagram 500 includes the distributed storage system 100, a network 510, and client nodes 520-1 through 520-*p* (referred to as a client node 520 or as client nodes 520 for simplicity).

The distributed storage system 100 may be configured as described herein above. The network 510 may be, but is not limited to, a wireless, cellular or wired network, a local area network (LAN), a wide area network (WAN), a metro area network (MAN), the Internet, the worldwide web (WWW), similar networks, and any combination thereof. The client node 520 may be, but is not limited to, a server, a personal computer, a laptop, a tablet computer, a smartphone, or any other device configured to store data, access data, or both.

The client node 520 is configured to send access commands to the distributed storage system 100 via the network 510. The CNodes 140 are configured to translate access commands received from the client nodes 520 and to access the DNodes 150 based on the translated commands as described herein above. As shown in FIG. 5, each CNode 140 may access all of the DNodes 150. As a non-limiting example, NVM Express (NVMe) over Fabrics may be utilized to enable such access.

Figure 6:
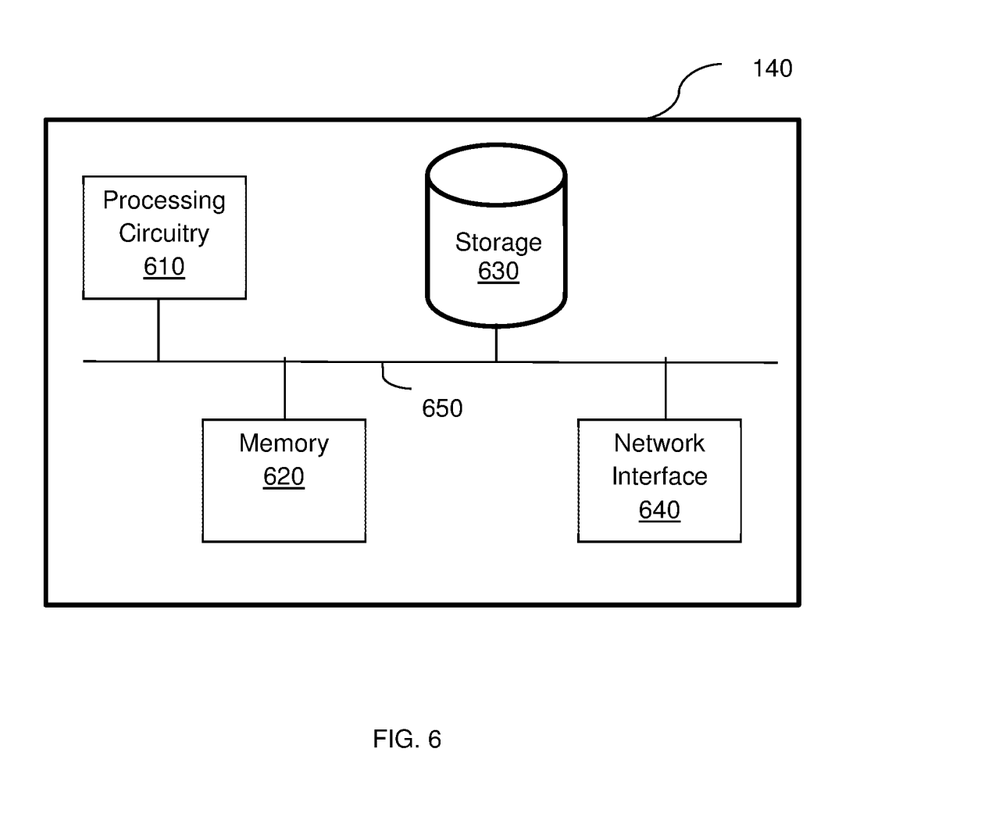
FIG. 6 is a schematic diagram of a compute node according to an embodiment.

FIG. 6 is a schematic diagram of a CNode 140 according to an embodiment. The CNode 140 includes a processing circuitry 610, a memory 620, a storage 630, and a network interface 640.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 620 may be volatile (e.g., RAM, etc.) memory. In an embodiment, the memory 620 is configured to store software for execution by the processing circuitry 610. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 610 to perform the various processes described herein.

The storage 630 may be magnetic storage, optical storage, and the like, and may be realized, for example, as flash memory or other non-volatile memory technology, CD-ROM, Digital Versatile Disks (DVDs), or any other non-transitory computer readable medium which can be used to store the desired information. The storage 630 may store the instructions for transfer to and storage in the memory 620 for execution by the processing circuitry 610.

The network interface 640 allows the CNode 140 to receive access commands and send data over the network 510, FIG. 5.

It should be understood that the embodiments described herein are not limited to CNodes having the specific architecture illustrated in FIG. 6, and other architectures may be equally used without departing from the scope of the disclosed embodiments.

The various embodiments disclosed herein can be implemented at least partially via software. The software is preferably implemented as an application program tangibly embodied on a program storage unit or computer readable medium consisting of parts, or of certain devices or combinations of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A storage system, comprising:
   a plurality of storage nodes (DNodes), wherein the DNodes are configured to store a plurality of elements and a plurality of data blocks, wherein each element is a persistent metadata structure, wherein at least one of the elements store at least one attribute, wherein the at least one attribute includes a plurality of pointers, wherein at least one of the data blocks is stored in at least one of the elements when the at least one of the data blocks has a size below a threshold size; and
   a plurality of compute nodes (CNodes), wherein each CNode has access to each of the DNodes, wherein each CNode is configured to receive an access command and to execute the access command based on the elements.

2. The storage system of claim 1, wherein the plurality of pointers includes a pointer to each of the data blocks, wherein execution of the access command includes identifying a portion of one of the DNodes based on the plurality of pointers and performing the access command on the identified portion.

3. The storage system of claim 1, wherein the plurality of pointers further includes at least one handle, wherein each handle is a unique identifier of one of the elements.

4. The storage system of claim 3, wherein the elements include a plurality of metadata blocks, wherein each attribute is stored in one of the plurality of metadata blocks, wherein each element has an element tree including a set of the plurality of metadata blocks.

5. The storage system of claim 4, each element tree having a root, wherein the roots of the element trees are stored in a global hash table that is distributed among the plurality of DNodes.

6. The storage system of claim 4, wherein the DNodes further include a plurality of first storage devices and a plurality of second storage devices, wherein each element tree is stored partially in at least one of the first storage devices and partially in at least one of the second storage devices.

7. The storage system of claim 6, wherein each first storage device is a 3D XPoint device, wherein each second storage device is a Flash memory device.

8. The storage system of claim 6, each first storage device having a write buffer including an unused portion, wherein each CNode is further configured to temporarily write each of the data blocks to a respective first storage device of the plurality of first storage devices, wherein each CNode is further configured to write one of the temporarily written data blocks to one of the second storage devices when the unused portion of the write buffer of the respective first storage device is below a threshold.

9. The storage system of claim 4, wherein executing the access command includes locking at least one of the metadata blocks when the access command is a write command.

10. The storage system of claim 9, wherein the at least one of the metadata blocks is not locked by a central lock manager.

11. The storage system of claim 4, wherein executing the access command does not include locking a portion of the DNodes when the access command is a read command.

12. The storage system of claim 1, wherein the DNodes support a protocol, wherein each CNode is further configured to translate the received access command based on the protocol supported by the DNodes.

13. The storage system of claim 1, wherein the DNodes further include a plurality of random access memory (RAM) devices, wherein executing the access command further includes locking, by one of the CNodes, a portion of the plurality of RAM devices using at least one remote direct memory access compare-and-swap operation.

14. A storage system, comprising:
   a plurality of storage nodes (DNodes), wherein the DNodes are configured to store a plurality of elements and a plurality of data blocks, wherein each element is a persistent metadata structure, wherein the plurality of elements include a plurality of metadata blocks, wherein the plurality of metadata blocks store a plurality of attributes, wherein the plurality of attributes includes a plurality of pointers, wherein each element has an element tree including a set of the plurality of metadata blocks, each element tree having a root, wherein the roots of the element trees are stored distributed among the plurality of DNodes; and
   a plurality of compute nodes (CNodes), wherein each CNode has access to each of the DNodes, wherein each CNode is configured to receive an access command and to execute the access command based on the elements.

15. The storage system of claim 14, wherein the plurality of DNodes further store a global hash table distributed among the plurality of DNodes, wherein the roots of the element trees are stored in the global hash table.

16. The storage system of claim 14, wherein the DNodes further include a plurality of first storage devices and a plurality of second storage devices, wherein each element tree is stored partially in at least one of the first storage devices and partially in at least one of the second storage devices.

17. The storage system of claim 16, wherein each first storage device is a 3D XPoint device, wherein each second storage device is a Flash memory device.

18. The storage system of claim 16, each first storage device having a write buffer including an unused portion, wherein each CNode is further configured to temporarily write each of the data blocks to a respective first storage device of the plurality of first storage devices, wherein each CNode is further configured to write one of the temporarily written data blocks to one of the second storage devices when the unused portion of the write buffer of the respective first storage device is below a threshold.

19. The storage system of claim 14, wherein executing the access command includes locking at least one of the metadata blocks when the access command is a write command.

20. The storage system of claim 14, wherein executing the access command does not include locking a portion of the DNodes when the access command is a read command.

* * * * *